(12) United States Patent
He et al.

(10) Patent No.: US 11,294,500 B2
(45) Date of Patent: Apr. 5, 2022

(54) TOUCH PANEL FOR SENSING A FINGERPRINT AND A TOUCH INPUT AND DISPLAY DEVICE USING THE SAME

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/009,709

(22) Filed: Sep. 1, 2020

(65) Prior Publication Data
US 2022/0066611 A1 Mar. 3, 2022

(51) Int. Cl.
*G06F 3/041* (2006.01)
*G06V 40/13* (2022.01)
*G06F 3/044* (2006.01)

(52) U.S. Cl.
CPC ...... *G06F 3/04166* (2019.05); *G06V 40/1306* (2022.01); *G06F 3/044* (2013.01)

(58) Field of Classification Search
CPC .......................... G06F 3/04166; G06K 9/0002
USPC ................................................. 345/173–175
See application file for complete search history.

(56) References Cited

U.S. PATENT DOCUMENTS

| | | | | |
|---|---|---|---|---|
| 2013/0069914 A1* | 3/2013 | Chang | ..................... | G06F 3/042 345/175 |
| 2013/0321337 A1* | 12/2013 | Graham | .............. | G06F 3/03547 345/174 |
| 2016/0328090 A1* | 11/2016 | Klinghult | ................. | G09G 3/32 |
| 2016/0364593 A1* | 12/2016 | Lee | ..................... | G06F 3/04164 |
| 2018/0341354 A1* | 11/2018 | Guo | ...................... | G06F 3/0412 |
| 2020/0128233 A1* | 4/2020 | Jannard | .................. | G03B 35/08 |
| 2020/0343325 A1* | 10/2020 | Cai | ................... | G06F 3/041662 |
| 2021/0072556 A1* | 3/2021 | Kim | ..................... | H01L 51/5275 |
| 2021/0271850 A1* | 9/2021 | Chang | ................ | G06K 9/00087 |

* cited by examiner

*Primary Examiner* — Prabodh M Dharia
(74) *Attorney, Agent, or Firm* — CKC & Partners Co., LLC

(57) ABSTRACT

A touch panel for sensing a fingerprint/touch input and a display device using the same are provided. The display device includes a display panel and the touch panel. The touch panel includes drive line groups and sense line groups. Each of the drive line groups includes a drive line. Each of the sense line groups includes sense lines. A distance between adjacent two of the drive/sense line groups in a fingerprint recognition area is smaller than that between adjacent two of the drive/sense line groups in a portion of a touch control area other than the fingerprint recognition area. A distance between adjacent two of the sense lines in the fingerprint recognition area is designed to be equal a sub-pixel width, and a distance between adjacent two of the drive lines in the fingerprint recognition area is designed to be equal a sub-pixel length.

20 Claims, 10 Drawing Sheets

TOUCH PANEL FOR SENSING A FINGERPRINT AND A TOUCH INPUT AND DISPLAY DEVICE USING THE SAME

BACKGROUND

Field of Invention

The present invention relates to a touch panel for sensing a fingerprint and a touch input, and a display device using the touch panel.

Description of Related Art

Touch sensing technology is commonly used in various computer devices, such as a smart phone, notebook and digital camera. For example, the smart phone may include a touch panel for sensing a touch input of a user, thereby obtaining a touch position and performing a corresponding function. Further, the computer device may include a fingerprint sensing device for data security. For example, the fingerprint sensing device is used to sense a fingerprint of the user. The sensed fingerprint pattern is then compared with a fingerprint template to determine if the user is allowed to use the smart phone. However, cost and size of the smart phone is significantly increased due to the addition of the fingerprint sensing device.

SUMMARY

Embodiments of the present invention provide a touch panel and a display device using the same to solve the above problems.

In accordance with some embodiments of the present invention, the touch panel is configured to sense a touch input and a fingerprint of a user, and is adapted for a display panel, in which the display panel includes a plurality of pixels, and each of the pixels includes a plurality of sub-pixels corresponding to different colors. The touch panel includes a plurality of first drive lines and a plurality of first sense lines. Adjacent two of the first drive lines have a first distance therebetween. Adjacent two of the first sense lines have a second distance therebetween. One of the first distance and the second distance is equal to a sub-pixel length of each of the sub-pixels and the other one of the first distance and the second distance is equal to a sub-pixel width of each of the sub-pixels.

In some embodiments, each of the first drive lines has a plurality of drive line segments arranged in a form of zigzag, and each of the drive line segments has a length equal to a length of a diagonal line of each of the pixels, or has a length equal to a length of a diagonal line of each of the sub-pixels.

In some embodiments, each of the first sense lines has a plurality of sense line segments arranged in a form of zigzag, and each of the sense line segments has a length equal to a length of a diagonal line of each of the pixels, or has a length equal to a length of a diagonal line of each of the sub-pixels.

In some embodiments, the first drive lines and the first sense lines are arranged to intersect each other.

In some embodiments, the first drive lines and the first sense lines are configured to sense the fingerprint of the user.

In some embodiments, the sub-pixels respectively correspond to red, blue and green colors.

In accordance with some embodiments of the present invention, the display device includes a display panel and a touch panel. The display panel includes a plurality of pixels, in which each of the pixels includes a plurality of sub-pixels corresponding to different colors, each sub-pixels has a sub-pixel width and a sub-pixel length. The touch panel is disposed on the display panel, in which the touch panel includes a plurality of first drive lines and a plurality of first sense lines, adjacent two of the first drive lines have a first distance therebetween, adjacent two of the first sense lines have a second distance therebetween, one of the first distance and the second distance is equal to the sub-pixel length, and the other one of the first distance and the second distance is equal to the sub-pixel width.

In some embodiments, each of the pixels has a pixel width and a pixel length greater than or equal to the pixel width.

In some embodiments, the sub-pixels in each of the pixels are arranged along the direction of the pixel length.

In some embodiments, the pixels are arranged in a form of matrix.

In some embodiments, each of the first drive lines has a plurality of drive line segments arranged in a form of zigzag, and each of the drive line segments has a length equal to a length of a diagonal line of each of the pixels, or has a length equal to a length of a diagonal line of each of the sub-pixels.

In some embodiments, each of the first sense lines has a plurality of sense line segments arranged in a form of zigzag, and each of the sense line segments has a length equal to a length of a diagonal line of each of the pixels, or has a length equal to a length of a diagonal line of each of the sub-pixels.

In some embodiments, the first drive lines and the first sense lines are arranged to intersect each other.

In some embodiments, the first drive lines and the first sense lines are configured to sense a fingerprint.

In some embodiments, the sub-pixels respectively correspond to red, blue and green colors.

In accordance with some embodiments of the present invention, the touch panel is configured to sense a touch input and a fingerprint of a user, and includes a plurality of first drive line groups, a plurality of first sense line groups, a plurality of second drive line groups, a plurality of second sense line groups, a plurality of first integrated-drive-signal lines, a plurality of first integrated-sense-signal lines, a plurality of second integrated-drive-signal lines and a plurality of second integrated-sense-signal lines. The first drive line groups include a plurality of first drive lines. The first sense line groups include a plurality of first sense lines. The second drive line groups include a plurality of second drive lines. The second sense line groups include a plurality of second sense lines. The first integrated-drive-signal lines are electrically connected to the first drive line groups in a one-to-one manner. The first integrated-sense-signal lines are electrically connected to the first sense line groups in a one-to-one manner. The second integrated-drive-signal lines are electrically connected to the second drive line groups in a one-to-one manner. The second integrated-sense-signal lines are electrically connected to the second sense line groups in a one-to-one manner. Adjacent two of the first drive signal line groups have a first distance therebetween, adjacent two of the second drive signal line groups have a second distance therebetween, adjacent two of the first sense line groups have a third distance therebetween, adjacent two of the second sense line groups have a fourth distance therebetween, the first distance is smaller than the second distance, and the third distance is smaller than the fourth distance.

In some embodiments, the touch panel includes a fingerprint recognition area for sensing the fingerprint, and the first drive line groups and the first sense line groups are disposed corresponding to the fingerprint recognition area.

In some embodiments, when a fingerprint sensing mode is performed for sensing the fingerprint, the first drive line groups and the first sense line groups are enabled for sensing the fingerprint.

In some embodiments, when a touch sensing mode is performed for sensing the touch input, a portion of the first drive line groups and the first sense line groups are enabled for sensing the touch input, and another portion of the first drive line groups and the first sense line groups are disabled.

In some embodiments, when the touch sensing mode is performed for sensing the touch input, the second drive line groups and the second sense line groups are enabled to sense the touch input.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
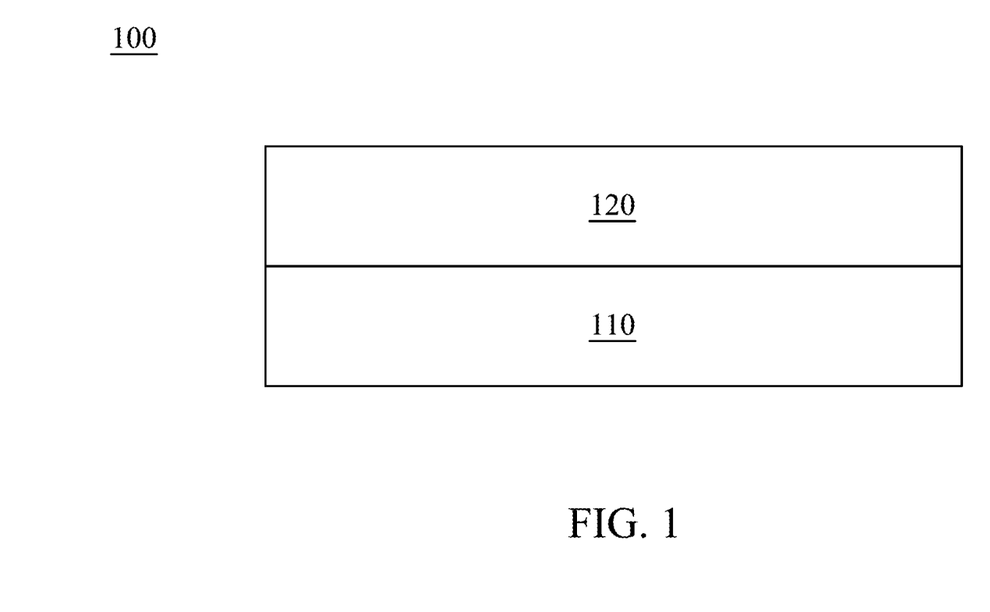
FIG. 1 is a schematic diagram illustrating a display device in accordance with embodiments of the present invention.
Figure 2:
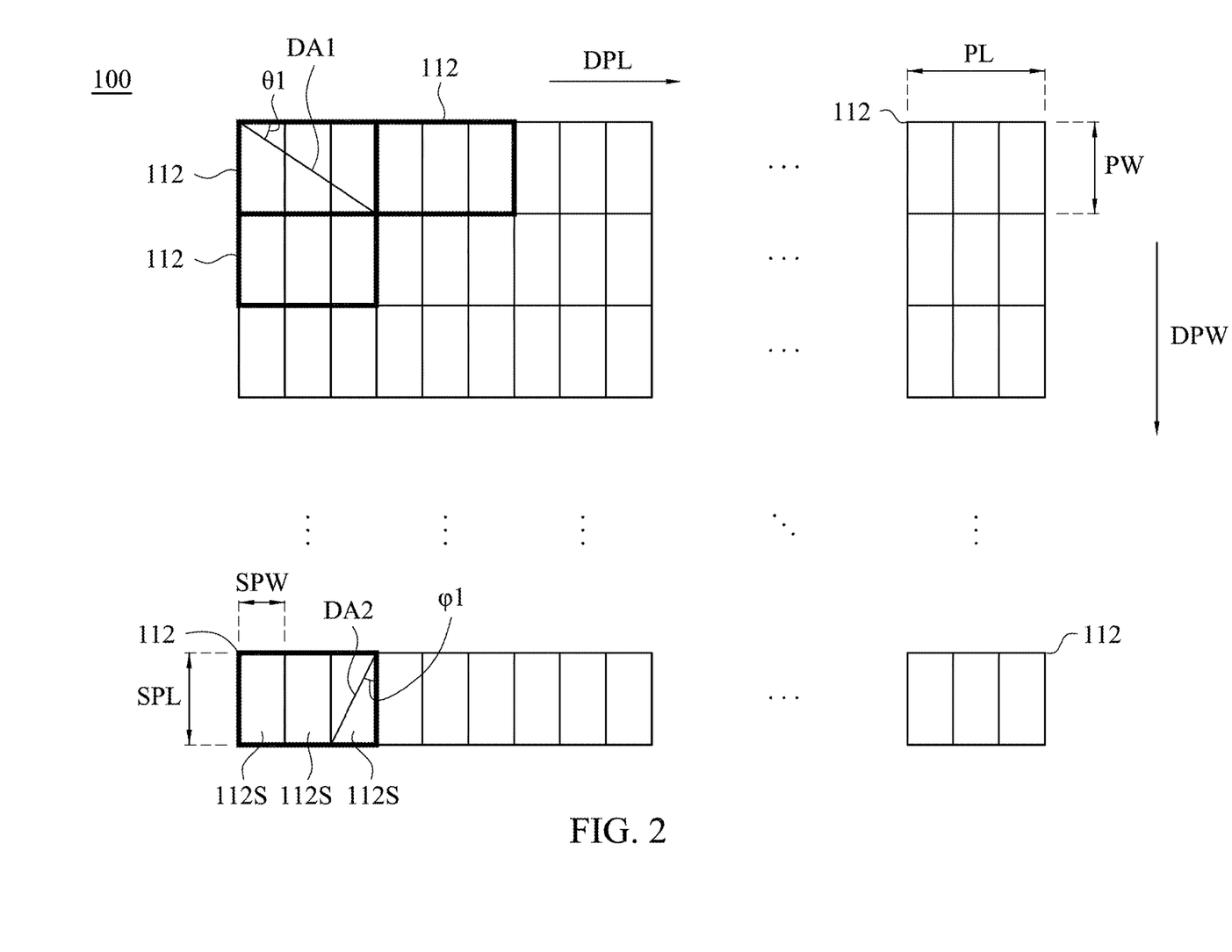
FIG. 2 is a schematic diagram illustrating pixels of the display panel in accordance with embodiments of the present invention.
Figure 3:
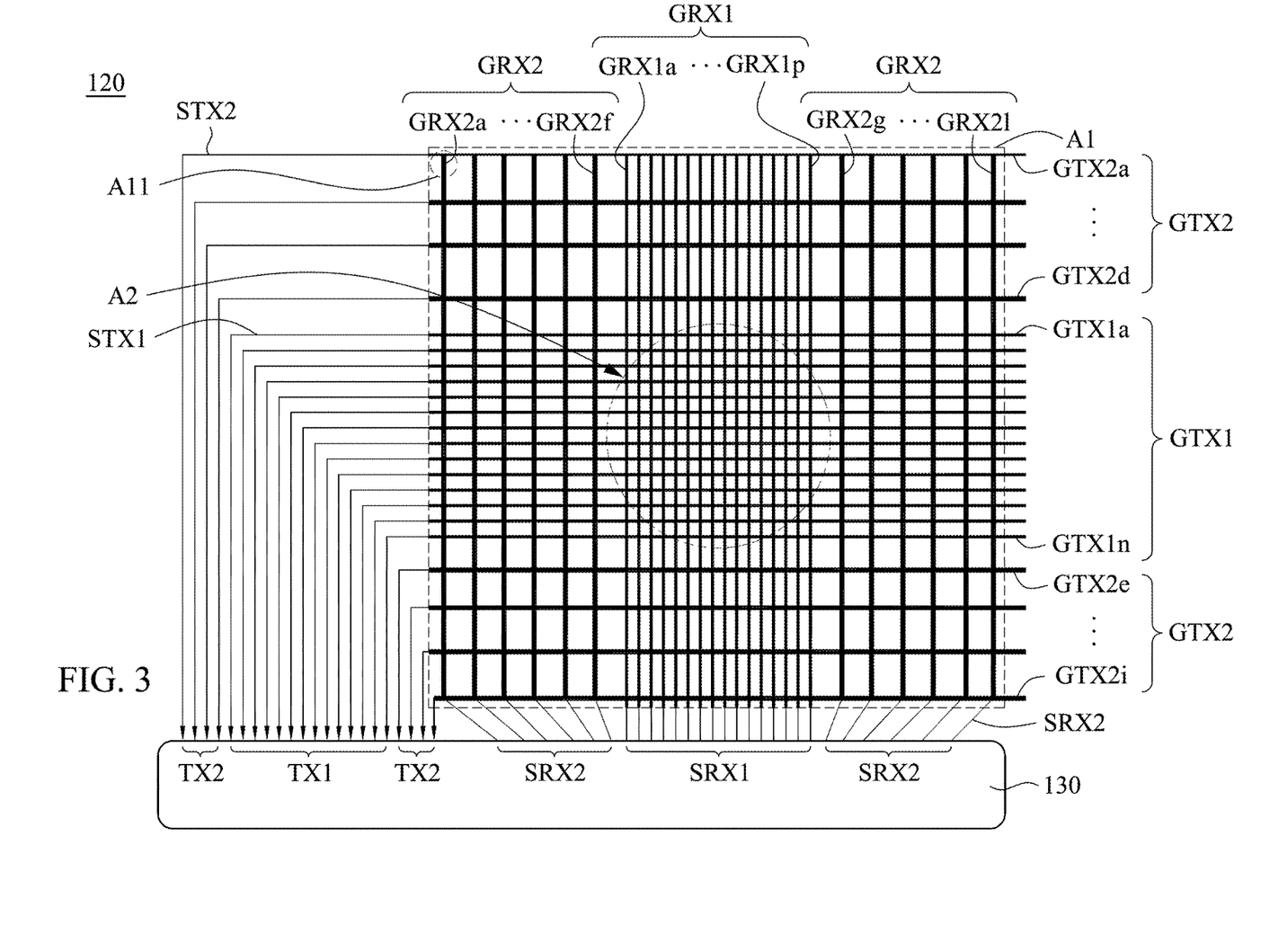
FIG. 3 is a schematic diagram illustrating drive/sense lines of a touch panel 120 in accordance with embodiments of the present invention.

Referring to FIG. 1 to FIG. 3, FIG. 1 is a schematic diagram illustrating a display device 100 in accordance with embodiments of the present invention, FIG. 2 is a schematic diagram illustrating pixels of the display panel 110 in accordance with embodiments of the present invention, and FIG. 3 is a schematic diagram illustrating drive/sense lines of a touch panel 120 in accordance with embodiments of the present invention. As shown in FIG. 1, the display device 100 includes the display panel 110 and the touch panel 120. The display panel 110 is configured to display images. The touch panel 120 is disposed on the display panel 110 for sensing a touch input and a fingerprint of a user. Specifically, a touch sensing function for sensing the touch input of the user and a fingerprint sensing function for sensing the fingerprint of the user are integrated into the touch panel 120. In this embodiment, the display panel 110 is a liquid crystal display panel, and the touch panel 120 is a capacitive touch panel. However, embodiments of the present invention are not limited thereto.

As shown in FIG. 2, the display panel 110 includes plural pixels 112, and each of the pixels 112 includes plural sub-pixels 112S corresponding to different colors. In this embodiment, the pixels 112 are arranged in a form of matrix, and the sub-pixels 112S respectively correspond to red, blue and green colors. However, embodiments of the present invention are not limited thereto. Each of the pixels 112 has a pixel width PW and a pixel length PL greater than or equal to the pixel width PW. Each of the pixels 112 also has a diagonal line DA1, and there is an angle 81 included by the diagonal line DA1 and a direction DPL of the pixel length PL. Further, each of the sub-pixels 112S has a sub-pixel width SPW and a sub-pixel length SPL greater than or equal to the sub-pixel width SPW. In each of the pixels 112, the sub-pixels 112S are arranged along the direction DPL of the pixel length PL in an order of red sub-pixel, green sub-pixel and blue sub-pixel, and extended along a direction DPW of the pixel width PW of the pixel 112. Each of the sub-pixels 112S also has a diagonal line DA2, and there is an angle φ1 is included by the diagonal line DA2 and the direction DPW of the pixel width PW of the pixel 112.

As shown in FIG. 3, the touch panel 120 includes plural first drive line groups GTX1a-GTX1n, plural first sense line groups GRX1a-GRX1p, plural second drive line groups GTX2a-GTX2i, plural second sense line groups GRX2a-2l, plural first integrated-drive-signal lines STX1, plural first integrated-sense-signal lines SRX1, plural second integrated-drive-signal lines STX2, plural second integrated-sense-signal lines SRX2 and a controller circuit 130. Each of the first drive line groups GTX1a-GTX1n includes at least one drive line, and each of the second drive line groups GTX2a-GTX2i includes at least one drive line. Similarly, each of the first sense line groups GRX1a-GRX1p includes at least one sense line and each of the second sense line groups GRX2a-2l includes at least one sense line. Hereinafter, the first drive line groups GTX1a-GTX1n are collectively referred to as first drive line groups GTX1, the second drive line groups GTX2a-GTX2i are collectively referred to as second drive line groups GTX2, the first sense line groups GRX1a-GRX1p are collectively referred to as first sense line groups GRX1, and the second sense line groups GRX2a-2l are collectively referred to as second sense line groups GRX2.

In some embodiments, the first drive line groups GTX1 and the second drive line groups GTX2 intersect the first sense line groups GRX1 and the second sense line groups GRX2 in a touch control area A1 for sensing the touch input of the user. The touch control area A1 corresponds to a display area of the display panel 110 and includes a fingerprint recognition area A2 for sensing the fingerprint of the user. The first drive line groups GTX1, the second drive line groups GTX2, the first sense line groups GRX1 and the second sense line groups GRX2 are electrically connected to the controller circuit 130 through the first integrated-drive-signal lines STX1, the second integrated-drive-signal lines STX2, the first integrated-sense-signal lines SRX1, and the second integrated-sense-signal lines SRX2.

Specifically, the first integrated-drive-signal lines STX1 are electrically connected to the first drive line groups GTX1 in a one-to-one manner, the second integrated-drive-signal lines STX2 are electrically connected to the second drive line groups GTX2 in a one-to-one manner, the first integrated-sense-signal lines SRX1 are electrically connected to the first sense line groups GRX1 in a one-to-one manner, and the second integrated-sense-signal lines SRX2 are electrically connected to the second sense line groups GRX2 in a one-to-one manner.

The controller circuit 130 is configured to perform a touch sensing mode to sense the touch input through the first drive line groups GTX1, the second drive line groups GTX2, the first sense line groups GRX1 and the second sense line groups GRX2. The controller circuit 130 is also configured to perform a fingerprint sensing mode to sense the fingerprint though the first drive line groups GTX1 and the first sense line groups GRX1 located in the fingerprint recognition area A2.

Figure 4A:
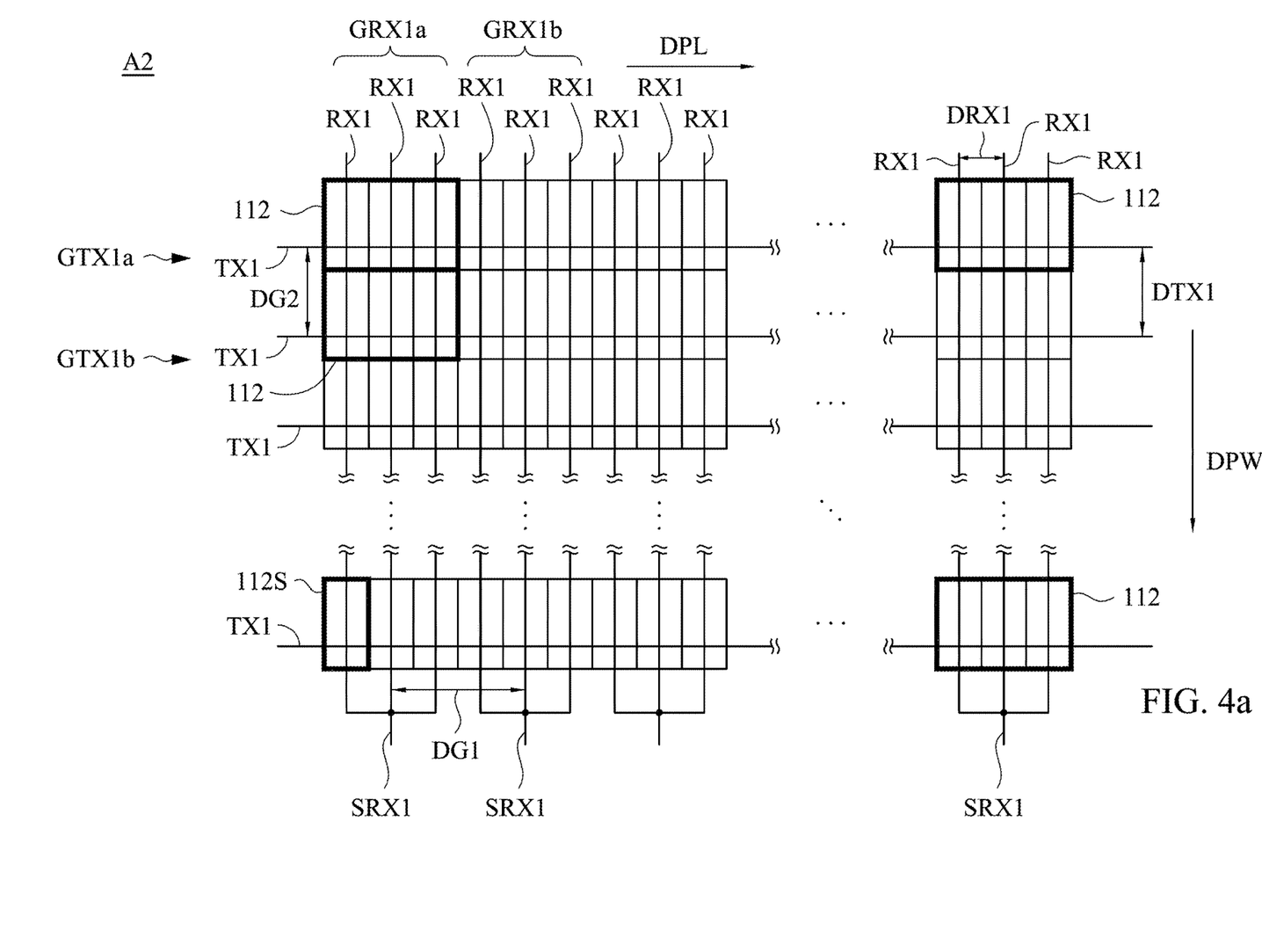
FIG. 4a is a schematic diagram illustrating the relationship between the pixels of the display panel and first drive lines and first sense lines in the fingerprint recognition area A2 of the touch panel in accordance with some embodiments of the present invention.
Figure 4B:
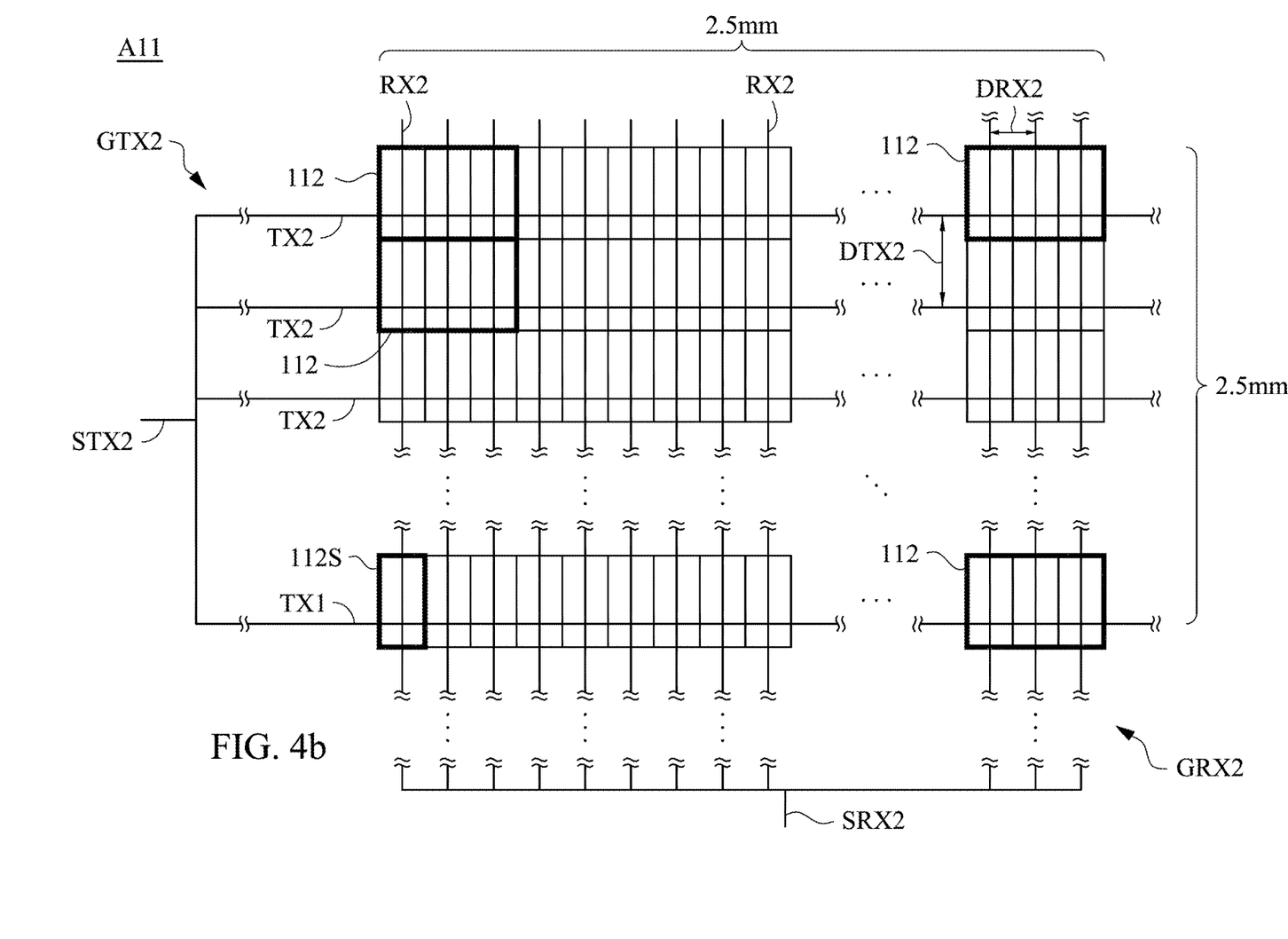
FIG. 4b is a schematic diagram illustrating the relationship between the pixels of the display panel and second drive lines and second sense lines in a portion of the touch control area other than the fingerprint recognition area in accordance with some embodiments of the present invention.

Referring to FIG. 4a and FIG. 4b, FIG. 4a is a schematic diagram illustrating the relationship between the pixels 112 of the display panel 110 and first drive lines TX1 and first sense lines RX1 in the fingerprint recognition area A2 of the touch panel 120 in accordance with some embodiments of the present invention, and FIG. 4b is a schematic diagram illustrating the relationship between the pixels 112 of the display panel 110 and second drive lines TX2 and second sense lines RX2 in a portion (for example portion A11 shown in FIG. 2) of the touch control area A1 other than the fingerprint recognition area A2 in accordance with some embodiments of the present invention.

As shown in FIG. 4a, the first drive lines TX1 are extended along the direction DPL of the pixel length PL of the pixel 112, and the first sense lines RX1 are extended along the direction DPW of the pixel width PW of the pixel 112. When the touch panel 120 is disposed on the display panel 110, a portion of each of the pixels 112 may be covered by the first drive lines TX1 and/or the first sense lines RX1.

To reduce the affection caused by the first drive lines TX1 and the first sense lines RX1 on the display performance of the display panel 110, a distance DTX1 between adjacent two of the first drive lines TX1 is designed to be equal to the sub-pixel length SPL (see FIG. 2) of the sub-pixel 112S, and a distance DRX1 between adjacent two of the first sense lines RX1 is designed to be equal to the sub-pixel width SPW (see FIG. 2) of the sub-pixel 112S. Therefore, in each of the sub-pixels 112S, the portion covered by the first drive lines TX1 and the first sense lines RX1 are substantially the same as that in the other sub-pixels 112S. For example, the area covered by the first drive lines TX1 and the first sense lines RX1 in one sub-pixel 112S is substantially the same as the area covered by the first drive lines TX1 and the first sense lines RX1 in the other one sub-pixel 112S.

Since the first drive lines TX1 and the first sense lines RX1 cause the same affection on each of the sub-pixels 112S, the affection on the display performance of the display panel 110 can be greatly reduced.

There is a distance DG1 between adjacent two of the first sense line groups GRX1 (for example, the first sense line group GRX1a and the first sense line group GRX1b), and the distance DG1 is defined by the center of the first sense line group GRX1a (for example, the first sense line RX1 at the middle position of the first sense line group GRX1a) and the center of the first sense line group GRX1b (for example, the first sense line RX1 at the middle position of the first sense line group GRX1b). Similarly, there is a distance DG2 between adjacent two of the first drive line groups GTX1 (for example, the first drive line group GTX1a and the first drive line group GTX1b) is defined by the center of the first sense line group GRX1a (i.e., the first drive line TX1) and the center of the first sense line group GRX1b (i.e., the first drive line TX1).

In some embodiments, the number of the first sense lines RX1 included by each of the first sense line groups GRX1 is determined in accordance with the pixel length PL (for example, 50 micrometers) of the pixel 112. For example, under the above condition that the distance DTX1 between adjacent two of the first drive lines TX1 is designed to be equal to the sub-pixel length SPL and the distance DRX1 between adjacent two of the first sense lines RX1 is designed to be equal to the sub-pixel width SPW, the distance DG1 is determined to be equal to the pixel length PL and every three first sense lines RX1 are electrically connected together to form one of the first sense line groups GRX1. In other words, returning to FIG. 2, in this embodiment, each one of the first sense line groups GRX1 includes three first sense lines RX1, and each one of the first drive line groups GTX1 includes one first drive line TX1.

As shown in FIG. 4b, the arrangement of the second sense line groups GRX2 in the portion A11 is similar to the arrangement of the first drive line groups GTX1 in the fingerprint recognition area A2, but the difference is in that each of the second drive line groups GTX2 includes N second drive lines TX2, where N is a positive integer and is determined in accordance with a predetermined touch-sensing resolution of the touch panel 120. For example, in this embodiment, the second drive lines TX2 in a range of 2.5 millimeters are electrically connected together to form one second drive line group GTX2.

The arrangement of the second sense line groups GRX2 in the portion A11 of the touch control area A1 is similar to the arrangement of the first sense line groups GRX1 in the fingerprint recognition area A2, but the difference is in that each of the second sense line groups GRX2 includes M second sense lines RX2, where M is a positive integer and is determined in accordance with the predetermined touch-sensing resolution of the touch panel 120. For example, in this embodiment, the second sense lines RX2 in a range of 2.5 millimeters are electrically connected together to form one second sense line groups GRX2.

Further, a distance DTX2 between adjacent two of the second drive lines TX2 is designed to be equal to the sub-pixel length SPL (see FIG. 2) of the sub-pixel 112S, and a distance DRX2 between adjacent two of the second sense lines RX2 is designed to be equal to the sub-pixel width SPW (see FIG. 2) of the sub-pixel 112S, thereby reducing the affection caused by the second drive lines TX2 and the second sense lines RX2 on the display performance of the display panel 110.

In some embodiments, there is a distance between adjacent two of the second sense line groups GRX2 (defined by the centers of the second sense line groups GRX2), and the distance is greater than the distance DG1 between adjacent two of the first sense line groups GRX1. Similarly, there is a distance between adjacent two of the second drive line groups GTX2 (defined by the centers of the second drive line groups GTX2), and the distance is greater than the distance DG2 between adjacent two of the first drive line groups GTX1.

When the fingerprint sensing mode is performed for sensing the fingerprint of the user, the first drive line groups GTX1 and the first sense line groups GRX1 are enabled for sensing the fingerprint, and the second drive line groups GTX2 and the second sense line groups GRX2 are disabled.

When the touch sensing mode is performed for sensing the touch input of the user, the second drive line groups GTX2, the second sense line groups GRX2 and the first drive line groups GTX1 are enabled to sense the touch input. A portion of the first sense line groups GRX1 are enabled together with the second drive line groups GTX2, the second sense line groups GRX2 and the first drive line groups GTX for sensing the touch input, but another portion of the first sense line groups GRX1 are disabled. For example, some of the first sense line groups GRX1 are selected to be enabled for sensing the touch input, and adjacent two of the selected first sense line groups GRX1 can be spaced by at least one of the other unselected first sense line groups GRX1. In some embodiments, all of the first drive line groups GTX1, the first sense line groups GRX1, the second drive line groups GTX2 and the second sense line groups GRX2 are enabled for sensing the touch input.

Figure 5A:
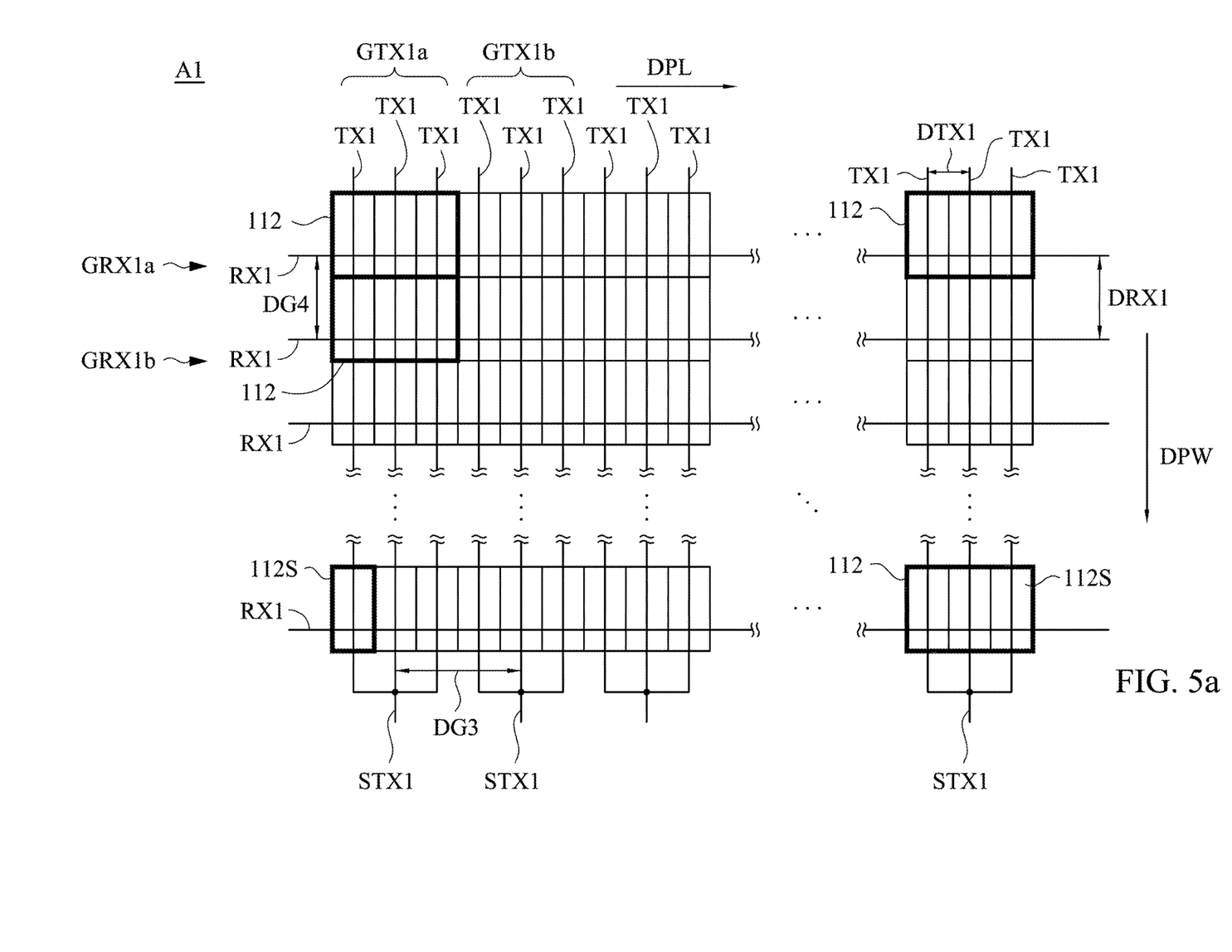
FIG. 5a is a schematic diagram illustrating the relationship between the pixels of the display panel and first drive lines and first sense lines in the fingerprint recognition area of the touch panel in accordance with some embodiments of the present invention.
Figure 5B:
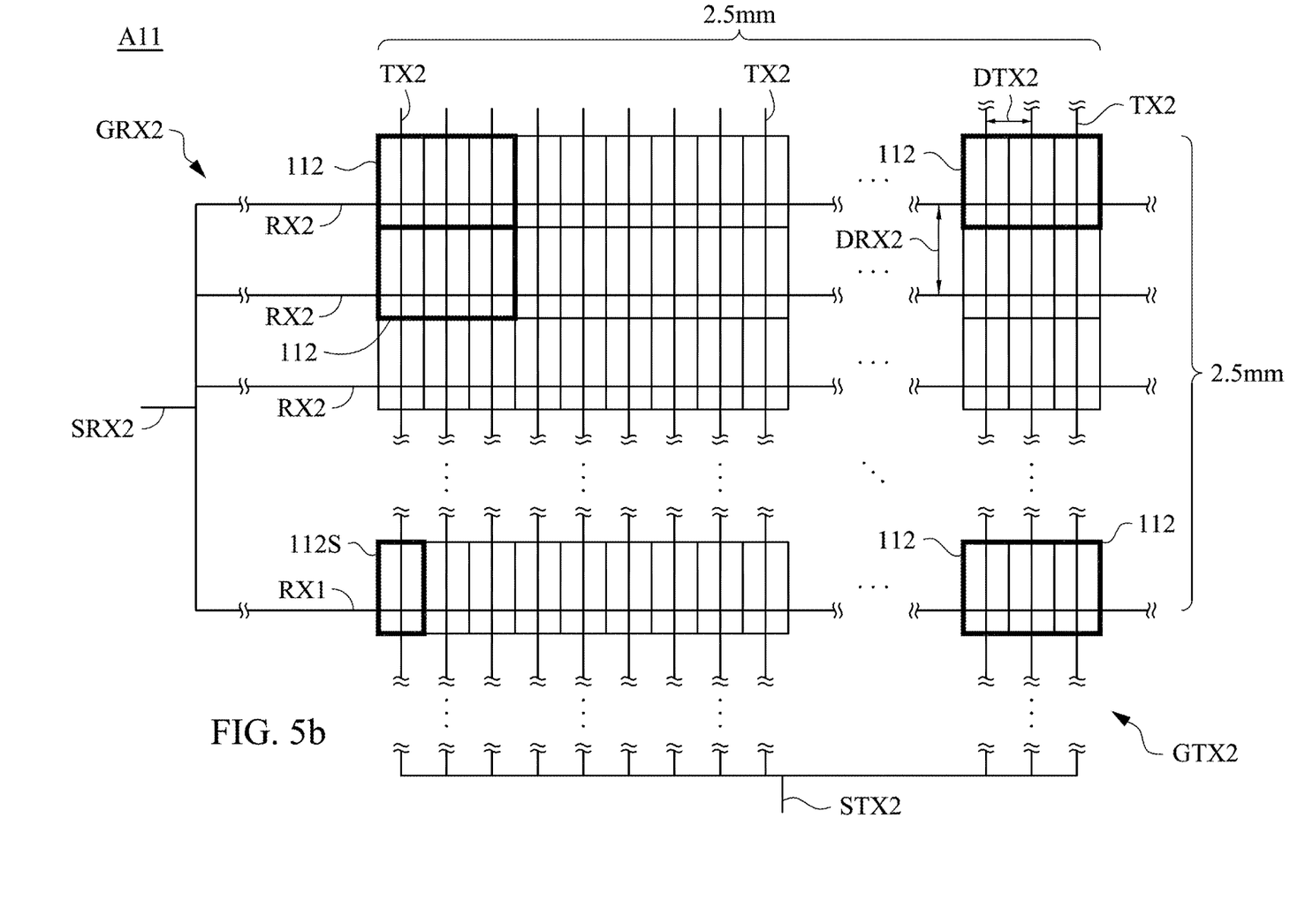
FIG. 5b is a schematic diagram illustrating the relationship between the pixels of the display panel and second drive lines and second sense lines in a portion of the touch control area of the touch panel in accordance with some embodiments of the present invention.

Referring to FIG. 5a and FIG. 5b, FIG. 5a is a schematic diagram illustrating the relationship between the pixels 112 of the display panel 110 and first drive lines TX1 and first sense lines RX1 in the fingerprint recognition area A2 of the touch panel 120 in accordance with some embodiments of the present invention, and FIG. 5b is a schematic diagram illustrating the relationship between the pixels 112 of the display panel 110 and second drive lines TX2 and second sense lines RX2 in a portion A11 (see FIG. 2) of the touch control area A1 of the touch panel 120 in accordance with some embodiments of the present invention. The embodiment of FIG. 5a and FIG. 5b is similar to the embodiment of FIG. 4a and FIG. 4b, but the difference is in that the first drive lines TX1 and the second drive lines TX2 are extended along the direction DPW, and the first sense lines RX1 and second sense lines RX2 are extended along the direction DPL.

As shown in FIG. 5a, the first drive lines TX1 are extended along the direction DPW of the pixel width PW of the pixel 112, and the first sense lines RX1 are extended along the direction DPL of the pixel length PL of the pixel 112. When the touch panel 120 is disposed on the display panel 110, a portion of each of the pixels 112 may be covered by the first drive lines TX1 and/or the first sense lines RX1.

To reduce the affection caused by the first drive lines TX1 and the first sense lines RX1 on the display performance of the display panel 110, the distance DTX1 between adjacent two of the first drive lines TX1 is designed to be equal to the sub-pixel width SPW (see FIG. 2) of the sub-pixel 112S, and the distance DRX1 between adjacent two of the first sense lines RX1 is designed to be equal to the sub-pixel length SPL (see FIG. 2) of the sub-pixel 112S. Therefore, in each of the sub-pixels 112S, the portion covered by the first drive lines TX1 and the first sense lines RX1 is substantially the same as that in the other sub-pixels 112S. For example, the area covered by the first drive lines TX1 and the first sense lines RX1 in one sub-pixel 112S is substantially the same as the area covered by the first drive lines TX1 and the first sense lines RX1 in the other one sub-pixel 112S.

Since the first drive lines TX1 and the first sense lines RX1 cause the same affection on each of the sub-pixels 112S, the affection on the display performance of the display panel 110 can be greatly reduced.

There is a distance DG3 between adjacent two of first drive line group GTX1 (for example, the first drive line group GTX1a and the first drive line group GTX1b), and the distance DG3 is defined by the center of the first drive line group GTX1a (for example, the first drive line TX1 at the middle position of the first drive line group GTX1a) and the center of the first drive line group GTX1b (for example, the first drive line TX1 at the middle position of the first drive line group GTX1b). Further, there is a distance DG4 between adjacent two of the first sense line groups GRX1 (for example, the first sense line group GRX1a and the first sense line group GRX1b) is defined by the center of the first sense line group GRX1a (i.e., the first sense line RX1) and the center of the first sense line group GRX1b (i.e., the first sense line RX1).

In some embodiments, the number of the first drive lines TX1 included by each of first drive line groups GTX1 is determined in accordance with the pixel length PL of the pixel 112. For example, under the above condition that the distance DTX1 between adjacent two of the first drive lines TX1 is designed to be equal to the sub-pixel width SPW and the distance DRX1 between adjacent two of the first sense lines RX1 is designed to be equal to the sub-pixel length SPL, the distance DG3 is determined to be equal to the pixel length PL and every three first drive lines RX1 are electrically connected together to form one of the first drive line groups GTX1. In other words, returning to FIG. 2, in this embodiment, each one of the first drive line groups GTX1 includes three first drive lines TX1, and each one of the first sense line groups GRX1 includes one first sense line RX1.

As shown in FIG. 5b, the arrangement of the second sense line groups GRX2 in the portion A11 of the touch control area A1 is similar to the arrangement of the first sense line groups GRX1 in the fingerprint recognition area A2, but the difference is in that each of the second sense line groups GRX2 includes X second drive lines RX2, where X is a positive integer and is determined in accordance with a predetermined touch-sensing resolution of the touch panel 120. For example, in this embodiment, the second sense lines RX2 in a range of 2.5 millimeters are electrically connected together to form one second sense line group GRX2.

The arrangement of the second drive line groups GTX2 in the portion A11 of the touch control area A1 is similar to the arrangement of the first drive line groups GTX1 in the fingerprint recognition area A2, but the difference is in that each of the second drive line groups GTX2 includes Y second drive lines TX2, where Y is a positive integer and is determined in accordance with the predetermined touch-sensing resolution of the touch panel 120. For example, in this embodiment, the second drive lines TX2 in a range of 2.5 millimeters are electrically connected together to form one second drive line groups GTX2.

Further, a distance DTX2 between adjacent two of the second drive lines TX2 is designed to be equal to the sub-pixel width SPW (see FIG. 2) of the sub-pixel 112S, and a distance DRX2 between adjacent two of the second sense lines RX2 is designed to be equal to the sub-pixel length SPL (see FIG. 2) of the sub-pixel 112S, thereby reducing the affection caused by the second drive lines TX2 and the second sense lines RX2 on the display performance of the display panel 110.

In some embodiments, there is a distance between adjacent two of the second drive line groups GTX2 (defined by the centers of the second drive line groups GTX2), and the distance is greater than the distance DG3 between adjacent two of the first drive line groups GTX1. Similarly, there is a distance between adjacent two of the second sense line groups GRX2 (defined by the centers of the second sense line groups GRX2), and the distance is greater than the distance DG4 between adjacent two of the first sense line groups GRX1.

When the fingerprint sensing mode is performed for sensing the fingerprint of the user, the first drive line groups GTX1 and the first sense line groups GRX1 are enabled for sensing the fingerprint, and the second drive line groups GTX2 and the second sense line groups GRX2 are disabled.

When the touch sensing mode is performed for sensing the touch input of the user, the second drive line groups GTX2, the second sense line groups GRX2 and the first sense line groups GRX1 are enabled to sense the touch input. A portion of the first drive line groups GTX1 are enabled together with the second drive line groups GTX2, the second sense line groups GRX2 and the first sense line groups GRX1 for sensing the touch input, but another portion of the first drive line groups GTX1 are disabled. For example, some of the first drive line groups GTX1 are selected to be enabled for sensing the touch input, and adjacent two of the selected first drive line groups GTX1 can be spaced by at least one of the other unselected first drive line groups GTX1. In some embodiments, all of the first drive line groups GTX1, the first sense line groups GRX1, the second drive line groups GTX2 and the second sense line groups GRX2 are enabled for sensing the touch input.

Figure 6:
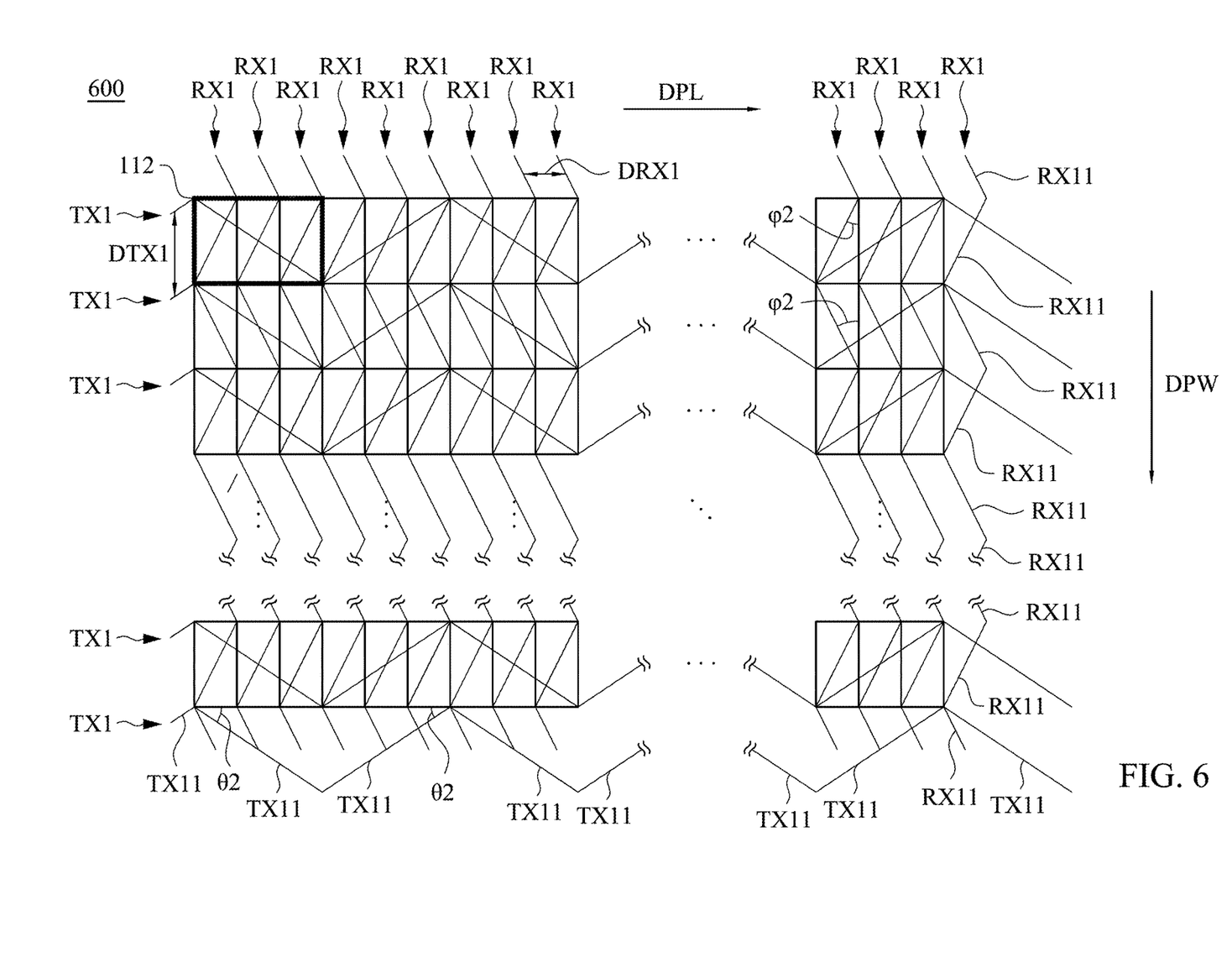
FIG. 6 is a schematic diagram illustrating sense lines and drive lines of a touch panel in accordance with some embodiments of the present invention.

Referring to FIG. 6, FIG. 6 is a schematic diagram illustrating sense lines and drive lines of a touch panel 600 disposed on the display panel 110 in accordance with some embodiments of the present invention. The touch panel 600 is similar to the touch panel 120, but the difference is in that each of the first drive lines TX1, the second drive lines TX2, the first sense lines RX1 and the second sense lines RX2 is designed to have a zigzag shape. For example, as shown in the FIG. 6, each of the first drive lines TX1 and the first sense line RX1 includes plural line segments arranged in a form of zigzag, in which the electric connection between the first sense lines RX1 are not shown for convenience.

Regarding the first drive lines TX1, each of the first drive lines TX1 includes plural drive line segments TX11 arranged in a form of zigzag. Each of the line segments TX11 is arranged in accordance with the pixel 112. For example, each of the drive line segments TX11 is designed to has a length equal to a length of the diagonal line DA1 of the pixel 112 (see FIG. 2), and an angle 82 included between each of the drive line segments TX11 and the direction DPL of the pixel length PL is designed to be equal to the angle 81 included by the diagonal line DA1 and the direction DPL of the pixel length PL (see FIG. 2). It is noted that, in this embodiment, the distance DTX1 between adjacent two of the first drive lines TX1 is designed to be equal to the sub-pixel length SPL of the sub-pixel 112S, too.

Regarding the first sense lines RX1, each of the first sense lines RX1 includes plural sense line segments RX11 arranged in a form of zigzag. Each of the sense line segments RX11 is arranged in accordance with the sub-pixel 112S. For example, each of the sense line segments RX11 is designed to has a length equal to a length of the diagonal line DA2 of the sub-pixel 112S (see FIG. 2), and an angle φ2 included between each of the sense line segments RX11 and the direction DPW of the pixel width PW of the pixel 112 is designed to be equal to the angle φ1 included by the diagonal line DA2 and the direction DPW of the pixel width PW of the pixel 112 (see FIG. 2). It is noted that, in this embodiment, the distance DRX1 between adjacent two of the first sense lines RX1 is designed to be equal to the sub-pixel width SPW of the sub-pixel 112S, too.

Figure 7:
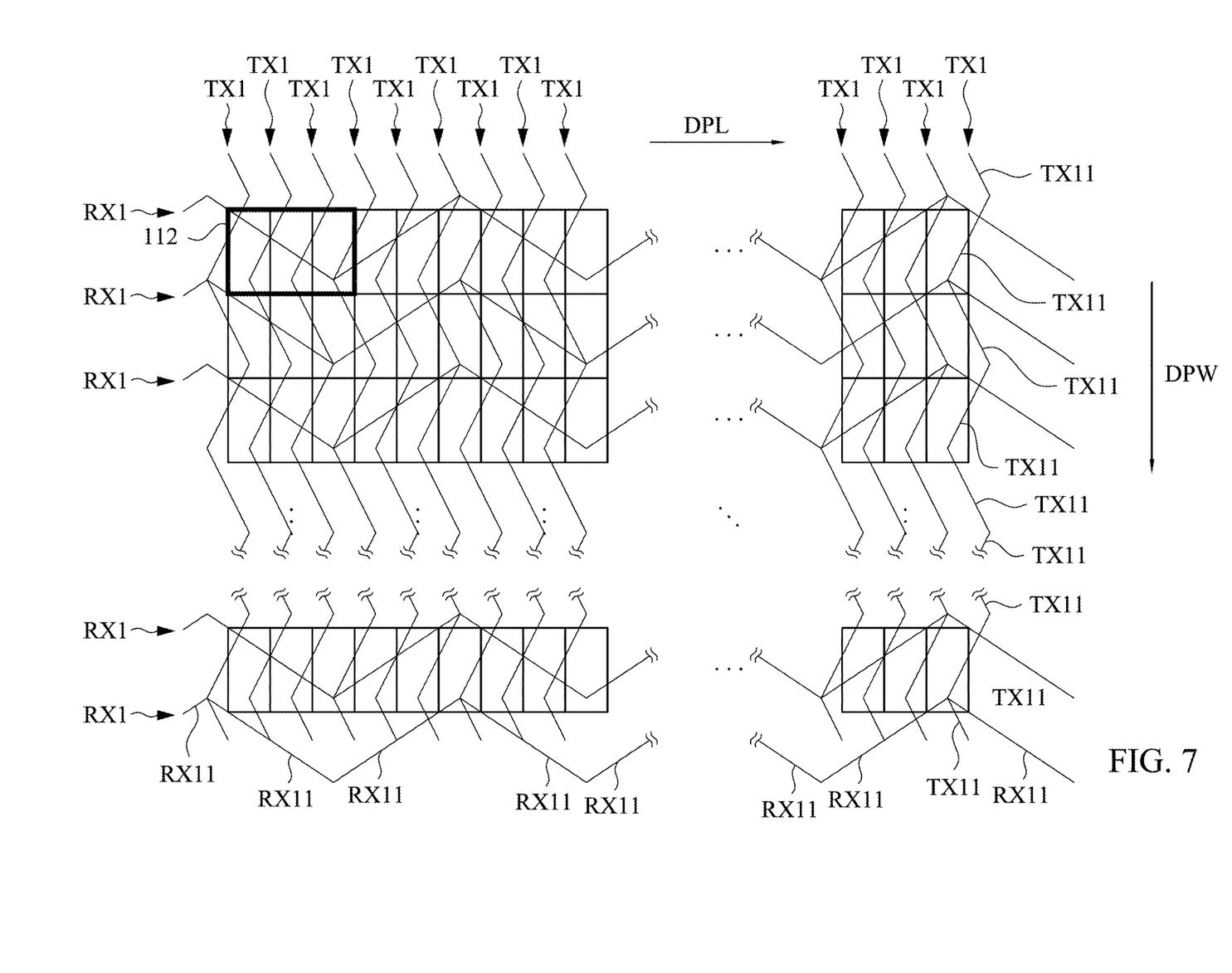
FIG. 7 is a schematic diagram illustrating sense lines and drive lines of a touch panel in accordance with some embodiments of the present invention.

Further, as shown in FIG. 7, the arrangement of the first drive lines TX1 and the first sense lines RX1 can be changed in accordance with the embodiment of FIG. 5a. For example, the first drive lines TX1 are extended along the direction DPW, and the first sense lines RX1 are extended along the direction DPL.

Furthermore, the second drive lines TX2 and the second sense lines RX2 of the touch panel 600 are designed to have the zigzag shape, too. Since the structure of each of the second drive lines TX2 and the second sense lines RX2 is similar to the structure of each of the first drive lines TX1 and the first sense lines RX1, the detail descriptions related to the second drive lines TX2 and the second sense lines RX2 are not repeated herein. In some embodiments, the arrangement of the second drive lines TX2 and the second sense lines RX2 of the touch panel 600 can be changed in accordance with the embodiment of FIG. 5b.

In this embodiment, each of the first drive lines TX1, the second drive lines TX2, the first sense lines RX1 and the second sense lines RX2 is designed to have the zigzag shape in accordance with the size of the pixel 112/sub-pixel 112S. Therefore, it is avoid that the first drive lines TX1, the second drive lines TX2, the first sense lines RX1 and the second sense lines RX2 are corresponded to black matrixes of the display panel 110 when the touch panel 600 and the display panel 110 are laminated together, and an additional aligning operation for aligning the first drive lines TX1, the second drive lines TX2, the first sense lines RX1 and the second sense lines RX2 to the pixels 122 of the display panel 110 can ignored when the touch panel 600 and the display panel 110 are laminated together, since each of the first drive lines TX1, the second drive lines TX2, the first sense lines RX1 and the second sense lines RX2 has the zigzag shape.

Figure 8:
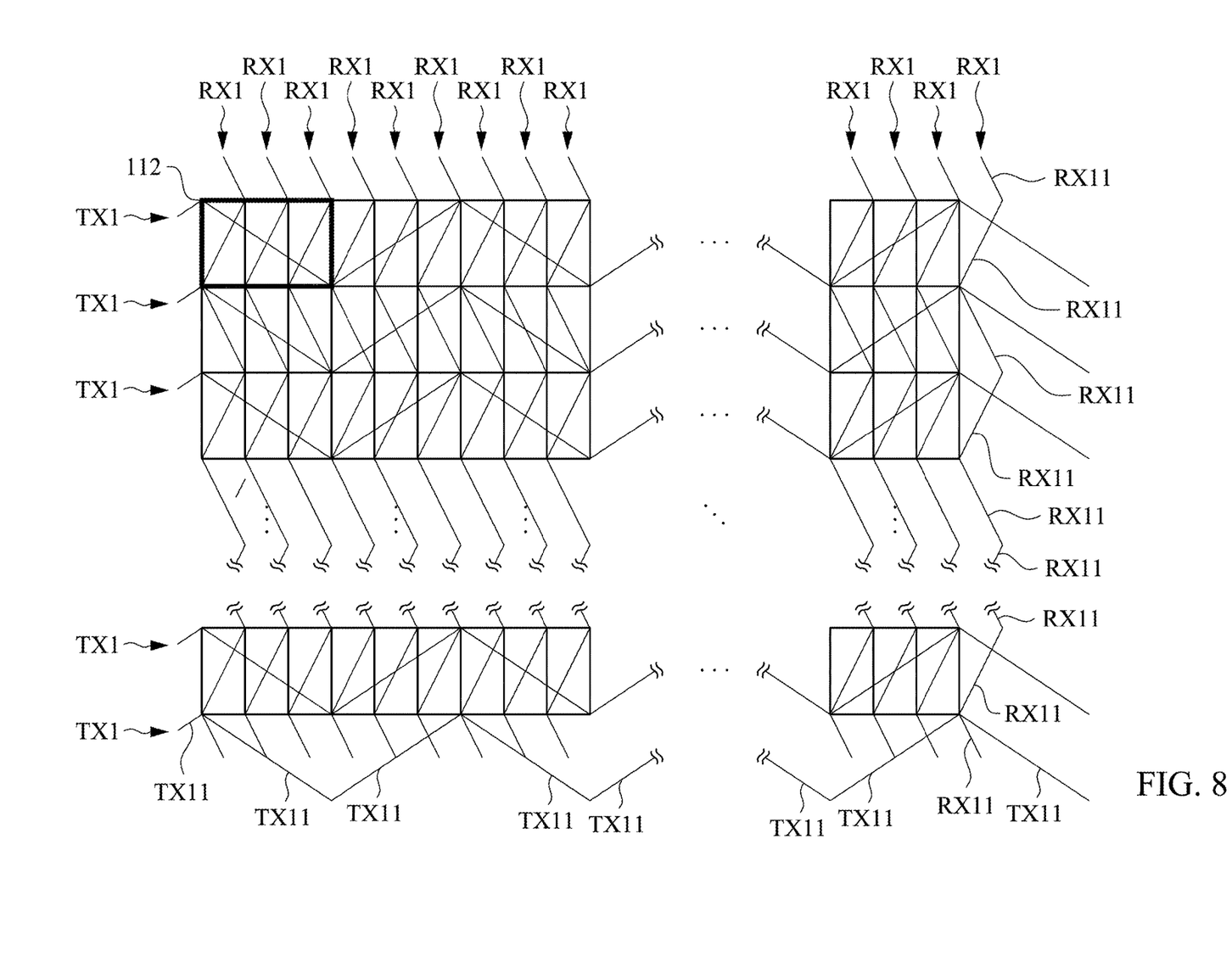
FIG. 8 is a schematic diagram illustrating sense lines and drive lines of a touch panel in accordance with some embodiments of the present invention.

For example, as shown in FIG. 8, when the touch panel 600 and the display panel 110 are laminated together, the touch panel 600 may be slightly shifted, and thus the first drive lines TX1 and the first sense lines RX1 are not aligned to the vertexes of the pixel 112/sub-pixel 112S. However, in this case, in each of the sub-pixels, the portion covered by the first drive lines TX1 and the first sense lines RX1 is substantially the same as that in the other sub-pixels. Therefore, even when the touch panel 600 is slightly shifted, the first drive lines TX1 and the first sense lines RX1 cause the same affection on each of the sub-pixels 112S, and the additional aligning operation for aligning the first drive lines TX1, the second drive lines TX2, the first sense lines RX1 and the second sense lines RX2 to the pixels 122 of the display panel 110 can be ignored.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel for sensing a touch input and a fingerprint of a user, wherein the touch panel is adapted for a display panel, the display panel comprises a plurality of pixels, each of the pixels comprises a plurality of sub-pixels corresponding to different colors, and the touch panel comprises:
a plurality of first drive lines; and
a plurality of first sense lines;
wherein adjacent two of the first drive lines have a first distance therebetween, adjacent two of the first sense lines have a second distance therebetween, one of the first distance and the second distance is equal to a sub-pixel length of each of the sub-pixels, and the other one of the first distance and the second distance is equal to a sub-pixel width of each of the sub-pixels;
wherein the orientations of the first drive lines and the first sense lines are interchangeable, and the first distance and the second distance are interchanged according to the interchange of the orientations of the first drive lines and the first sense lines.

2. The touch panel of claim 1, wherein each of the first drive lines has a plurality of drive line segments arranged in a form of zigzag, and each of the drive line segments has a length equal to a length of a diagonal line of each of the pixels, or has a length equal to a length of a diagonal line of each of the sub-pixels.

3. The touch panel of claim 1, wherein each of the first sense lines has a plurality of sense line segments arranged in a form of zigzag, and each of the sense line segments has a length equal to a length of a diagonal line of each of the pixels, or has a length equal to a length of a diagonal line of each of the sub-pixels.

4. The touch panel of claim 1, wherein the first drive lines and the first sense lines are arranged to intersect each other.

5. The touch panel of claim 1, wherein the first drive lines and the first sense lines are configured to sense the fingerprint of the user.

6. The touch panel of claim 1, wherein the sub-pixels respectively correspond to red, blue and green colors.

7. A display device, comprising:
a display panel comprising a plurality of pixels, wherein each of the pixels comprises a plurality of sub-pixels corresponding to different colors, each sub-pixels has a sub-pixel width and a sub-pixel length; and
a touch panel disposed on the display panel, wherein the touch panel comprises a plurality of first drive lines and a plurality of first sense lines, adjacent two of the first drive lines have a first distance therebetween, adjacent two of the first sense lines have a second distance therebetween, one of the first distance and the second distance is equal to the sub-pixel length, and the other one of the first distance and the second distance is equal to the sub-pixel width;
wherein the orientations of the first drive lines and the first sense lines are interchangeable, and the first distance and the second distance are interchanged according to the interchange of the orientations of the first drive lines and the first sense lines.

8. The display device of claim 7, wherein each of the pixels has a pixel width and a pixel length greater than or equal to the pixel width.

9. The display device of claim 8, wherein the sub-pixels in each of the pixels are arranged along the direction of the pixel length.

10. The display device of claim 7, wherein the pixels are arranged in a form of matrix.

11. The display device of claim 7, wherein each of the first drive lines has a plurality of drive line segments arranged in a form of zigzag, and each of the drive line segments has a length equal to a length of a diagonal line of each of the pixels, or has a length equal to a length of a diagonal line of each of the sub-pixels.

12. The display device of claim 7, wherein each of the first sense lines has a plurality of sense line segments arranged in a form of zigzag, and each of the sense line segments has a length equal to a length of a diagonal line of each of the pixels, or has a length equal to a length of a diagonal line of each of the sub-pixels.

13. The display device of claim 7, wherein the first drive lines and the first sense lines are arranged to intersect each other.

14. The display device of claim 7, wherein the first drive lines and the first sense lines are configured to sense a fingerprint.

15. The display device of claim 7, wherein the sub-pixels respectively correspond to red, blue and green colors.

16. A touch panel for sensing a touch input and a fingerprint of a user, comprising:
a plurality of first drive line groups comprising a plurality of first drive lines;
a plurality of first sense line groups comprising a plurality of first sense lines;
a plurality of second drive line groups comprising a plurality of second drive lines;
a plurality of second sense line groups comprising a plurality of second sense lines;
a plurality of first integrated-drive-signal lines electrically connected to the first drive line groups in a one-to-one manner;
a plurality of first integrated-sense-signal lines electrically connected to the first sense line groups in a one-to-one manner;
a plurality of second integrated-drive-signal lines electrically connected to the second drive line groups in a one-to-one manner; and
a plurality of second integrated-sense-signal lines electrically connected to the second sense line groups in a one-to-one manner;
wherein adjacent two of the first drive signal line groups have a first distance therebetween, adjacent two of the second drive signal line groups have a second distance therebetween, adjacent two of the first sense line groups have a third distance therebetween, adjacent two of the second sense line groups have a fourth distance therebetween, the first distance is smaller than the second distance, and the third distance is smaller than the fourth distance.

17. The touch panel of claim 16, wherein the touch panel comprises a fingerprint recognition area for sensing the fingerprint, and the first drive line groups and the first sense line groups are disposed corresponding to the fingerprint recognition area.

18. The touch panel of claim 17, wherein when a fingerprint sensing mode is performed for sensing the fingerprint, the first drive line groups and the first sense line groups are enabled for sensing the fingerprint.

19. The touch panel of claim 17, wherein when a touch sensing mode is performed for sensing the touch input, a portion of the first drive line groups and the first sense line groups are enabled for sensing the touch input, and another portion of the first drive line groups and the first sense line groups are disabled.

20. The touch panel of claim 19, wherein when the touch sensing mode is performed for sensing the touch input, the second drive line groups and the second sense line groups are enabled to sense the touch input.

* * * * *